(12) United States Patent
Chung et al.

(10) Patent No.: US 11,830,113 B2
(45) Date of Patent: Nov. 28, 2023

(54) SINGLE DYNAMIC IMAGE BASED STATE MONITORING

(71) Applicant: International Business Machines Corporation, Armonk, NY (US)

(72) Inventors: Albert Alexander Chung, Cary, NC (US); Alexander Dalton Chung, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 113 days.

(21) Appl. No.: 17/668,558

(22) Filed: Feb. 10, 2022

(65) Prior Publication Data
US 2023/0252697 A1 Aug. 10, 2023

(51) Int. Cl.
| G06T 11/20 | (2006.01) |
| G06V 10/32 | (2022.01) |
| G06F 11/30 | (2006.01) |
| G06F 11/34 | (2006.01) |
| G06V 10/40 | (2022.01) |

(52) U.S. Cl.
CPC .......... *G06T 11/203* (2013.01); *G06F 11/302* (2013.01); *G06F 11/3409* (2013.01); *G06V 10/32* (2022.01); *G06V 10/40* (2022.01)

(58) Field of Classification Search
CPC .. G06T 11/203; G06F 11/302; G06F 11/3409; G06V 10/32; G06V 10/40
See application file for complete search history.

(56) References Cited

U.S. PATENT DOCUMENTS

| 6,285,377 B1 | 9/2001 | Greenbaum et al. |
| 2004/0148578 A1 | 7/2004 | McConaghy et al. |
| 2009/0199196 A1* | 8/2009 | Peracha ............... G06F 11/3409 707/E17.014 |
| 2014/0006330 A1* | 1/2014 | Biem .................... G06F 21/552 706/46 |
| 2014/0022258 A1 | 1/2014 | Rogel |
| 2017/0257292 A1 | 9/2017 | Coates et al. |
| 2017/0316586 A1* | 11/2017 | Ricci ................... G06F 3/04842 |
| 2023/0045487 A1* | 2/2023 | Jain ..................... G06F 11/0751 |

(Continued)

OTHER PUBLICATIONS

Pickover, On the Educational Uses of Computer-Generated Cartoon Faces, J. Educational Technology Systems, vol. 13(3), 1984-85, 1985.

(Continued)

*Primary Examiner* — Maurice L. McDowell, Jr.
(74) *Attorney, Agent, or Firm* — Garg Law Firm, PLLC; Rakesh Garg; James Olsen

(57) ABSTRACT

A set of streams of time series data is mapped to a corresponding set of drawing coordinates of an image, wherein a first stream of time series data in the set of streams of time series data comprises data of a first executing application component, wherein a first drawing coordinate in the set of drawing coordinates represents a first state of the first executing application component at a first time. The set of drawing coordinates is drawn, wherein a line between the first drawing coordinate and a second drawing coordinate represents a dependency between the first executing application component and a second executing application component.

20 Claims, 11 Drawing Sheets

(56) References Cited

U.S. PATENT DOCUMENTS

2023/0196638 A1* 6/2023 Beckmann ............ G06V 10/761 345/589

OTHER PUBLICATIONS

Evangelisti et al., Autocorrelation-Faces: an Aid to Deaf Children Learning to Speak, Jan. 1, 1986.
IP.com, Method for the scalable visualization of Web site statistics, Oct. 10, 2001.
Pickover, DNA vectorgrams: representation of cancer genes as movements on a 2D cellular lattice, IBM Journal of Research and Development, vol. 31, No. 1, pp. 111-119, Jan. 1987.
Avantcontra, Drawing anything with Fourier Series using Blender and Python, Dec. 14, 2019, https://contra.medium.com/drawing-anything-with-fourier-series-using-blender-and-python-c0881e1b738c.
Mayer et al., Drawing an elephant with four complex parameters, American Journal of Physics, vol. 78, No. 6, pp. 648-649, Jun. 2010.
Wikipedia, Fourier Transform, 2022, https://en.wikipedia.org/wiki/Fourier_transform.
Wikipedia, Epicycloid, 2022, https://en.wikipedia.org/wiki/Epicycloid.
Harvard.edu, Ptolemaic Epicycle Machine, Harvard Natural Sciences Lecture Demonstrations, 2022, https://sciencedemonstrations.fas.harvard.edu/presentations/ptolemaic-epicycle-machine.
Mathematica & Wolfram Language, How can I draw a Homer with epicycloids?, Apr. 23, 2018, https://mathematica.stackexchange.com/questions/171755/how-can-i-draw-a-homer-with-epicycloids/171756#171756.
Mathematica & Wolfram Language, How to create a new "person curve"?, Apr. 23, 2018, https://mathematica.stackexchange.com/questions/17704/how-to-create-a-new-person-curve/171658#171658.
Novakovic, Introducing Dynamic Focus for Application Performance Management, May 12, 2017, https://www.instana.com/blog/introducing-dynamic-focus-application-performance-management/.

* cited by examiner

SINGLE DYNAMIC IMAGE BASED STATE MONITORING

BACKGROUND

The present invention relates generally to a method, system, and computer program product for state monitoring. More particularly, the present invention relates to a method, system, and computer program product for single image based state monitoring.

Observability is a measure of how well an internal state of a system can be inferred from knowledge of the system's external outputs. The more observable a system is, the more quickly and accurately one can navigate from an identified performance problem to the problem's root cause, without additional testing or coding. In computing, observability also refers to software tools and practices for aggregating, correlating, and analyzing a time series of data, e.g., performance data, from one or more applications and the hardware on which the applications execute, in order to monitor, troubleshoot, and debug application execution to meet customer experience expectations, service level agreements (SLAs) and other business requirements.

Observability includes logs, tracing, and metrics. Logs are granular, timestamped, and unchangeable records of application events. Metrics are measures of application and system health over a given period of time, such as how much memory or processor capacity an application uses over a five-minute span, or how much latency an application experiences during a spike in usage. A trace is a record of execution flow, for example from a user request through application components and back to the user.

SUMMARY

The illustrative embodiments provide a method, system, and computer program product. An embodiment includes a method that maps a set of streams of time series data to a corresponding set of drawing coordinates of an image, wherein a first stream of time series data in the set of streams of time series data comprises data of a first executing application component, wherein a first drawing coordinate in the set of drawing coordinates represents a first state of the first executing application component at a first time. An embodiment draws the set of drawing coordinates, wherein a line between the first drawing coordinate and a second drawing coordinate represents a dependency between the first executing application component and a second executing application component.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
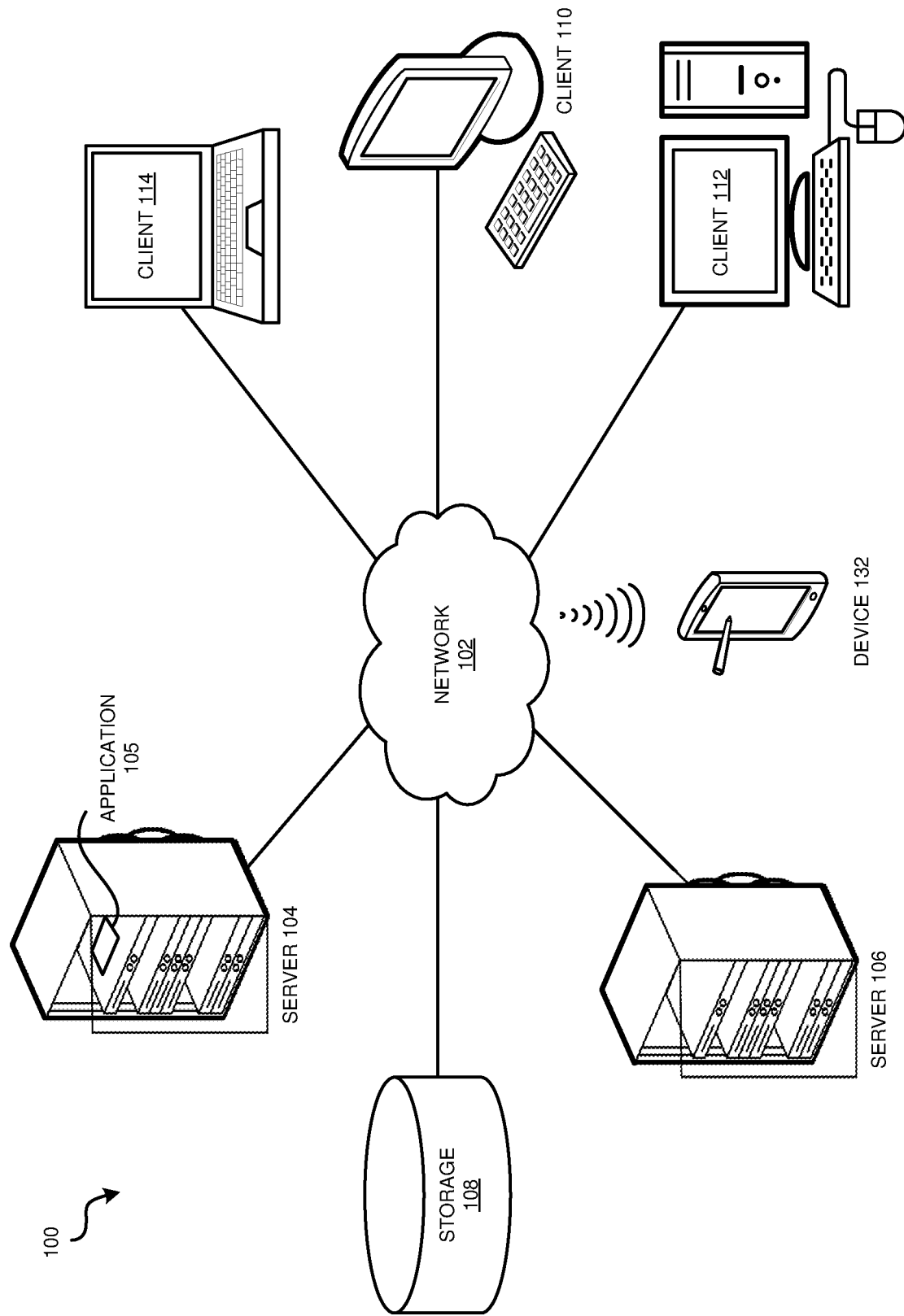
FIG. 1 depicts a block diagram of a network of data processing systems in which illustrative embodiments may be implemented.

The illustrative embodiments recognize that presently available visualization tools present logs, tracing, and metrics separately, without a unified view of a system's overall near real-time state and how the system reached its current state. Further, although each tool has a dashboard that presents system data, in an application with components distributed over multiple systems the components might generate hundreds of datasets—too many to display meaningfully on one dashboard. Further, the time series data generated is often presented as a set of graphs. A human monitor often finds it difficult to find meaningful information in such a set of graphs, particularly when more than a few are presented together. Even if the visualization tools are configurable to alert a human monitor if one or more sets of monitored data exceed predetermined values, the graphs and alerts do not provide a unified view of an overall, near real-time state of an application or system, or relationships between components of the application or system, that is easy for a human to interpret. Further, humans typically prefer to monitor an image that is pleasing to the eye, and different images might be pleasing to different people.

The illustrative embodiments recognize that the presently available tools or solutions do not address these needs or provide adequate solutions for these needs. The illustrative embodiments used to describe the invention generally address and solve the above-described problems and other problems related to single image based state monitoring.

An embodiment can be implemented as a software application. The application implementing an embodiment can be configured as a modification of an existing system or application monitoring system, as a separate application that operates in conjunction with an existing system or application monitoring system, a standalone application, or some combination thereof.

Particularly, some illustrative embodiments provide a method that maps a set of streams of time series data to a corresponding set of drawing coordinates of an image, and draws the set of drawing coordinates, using a line between a first drawing coordinate and a second drawing coordinate to represent a dependency between a first executing application or system component and a second executing application or system component.

An embodiment receives a user's selection of an image to be used for state monitoring. In one embodiment, a user supplies the image to be used. In another embodiment, a user selects the image from a library of images. Some non-limiting examples of an image to be used for state monitoring are a line drawing and a digital image of a scene. The image need not have any particular relationship to a system or system state, but instead may be any image a user finds useful for system or application state monitoring. In addition, the image can be any image that is displayable to a user, and need not be two-dimensional.

An embodiment extracts a set of drawing coordinates from the selected image. A drawing coordinate is a planar coordinate of an outline corresponding to the image. A planar coordinate has two components, an x coordinate denoting a position on an x-axis of a plane, and a y coordinate denoting a position on a y-axis, perpendicular to the x-axis, of the plane. For example, if the image is a line drawing in black on a white background, the set of drawing coordinates might include coordinates of all or a subset of the black pixels in the image, but not the white pixels. As another example, if the image portrays an object against a background, the set of drawing coordinates might include coordinates forming a border between a portion of the image portraying the object and a second portion of the image portraying the background. Image processing techniques to extract a set of drawing coordinates from the selected image, such as determining a set of pixels of a particular color or performing edge detection to distinguish an object from a background portion of a scene, are presently known. An embodiment arranges the set of drawing coordinates in a drawing order, a sequence in which the drawing coordinates will be drawn to render the image. One embodiment uses a presently known traveling salesman technique to find the shortest drawing order including all the drawing coordinates. Other techniques for arranging the set of drawing coordinates in a drawing order are also presently known and contemplated within the scope of the illustrative embodiments.

An embodiment receives time series data of an application component or system component being monitored. The time series data is data of one or more metrics being monitored for a component, a sequence of trace data, a sequence of log data or log data indices, or a combination. Some non-limiting examples of metrics are a counter (e.g. that 100 calls from application component A to application component B have been made since the counter was initialized), a gauge indicating a current value within a range (e.g. the processor on which application component A is executing is at 25% utilization), and a histogram classifying counter values into groups (e.g. there have been 12 calls that took less or equal to 0.005 second and 15 calls that took less or equal to 0.01 second). Trace data is typically recorded in spans. A trace span is a data structure that contains information such as relationships between components and time-stamp data. Log data records events, for example that an application component sent a request for data to another application component. Log data is typically sequentially recorded, with each log entry having an index such as a time stamp, log line number, or log entry identification.

An embodiment configures a data normalization to be applied to a particular type of metric. A configured data normalization also includes one or more thresholds defining a normal operational state of the metric. In one embodiment, a data normalization applied to a counter metric is configured to convert a set of counter values to a rate of increase of the counter over a predefined time period, and determine whether the rate of increase is within a normal operational state defined for that particular counter. For example, a data normalization applied to a counter counting data requests might be configured to convert a set of counter values to a rate of increase of the counter over a predefined time period, and determine whether the rate of increase is within a normal operational state defined for the data request counter. In one embodiment, a data normalization applied to a gauge metric is configured to convert a value of the metric to a zero to 100 percent range, and determine whether the current value is within a normal operational state defined for that particular gauge. For example, a data normalization applied to a CPU utilization metric is configured to convert a value of the metric to a zero to 100 percent range, and determine whether the current value is within a normal operational state defined for that particular gauge (e.g., below 90 percent utilization). One embodiment allows a user to configure a normalization and thresholds applicable to a specific metric.

An embodiment analyzes trace data of an executing application or system being monitored to determine data flow dependencies between application or system components. For example, an application might be implemented as a set of microservices, with microservice 1 interfacing with an end-user and calling microservices 2 and 3 to perform specific types of user requests. Microservice 3 might call microservice 4 to retrieve data from a database. Thus, there are dependencies between microservice 1 and microservices 2 and 3, and between microservices 3 and 4. An embodiment also analyzes trace data, such as time spent in each component, to determine latency between components.

An embodiment uses a configured data normalization to configure a mapping from an individual data stream to a particular drawing coordinate of the image. One embodiment allows a user to configure a mapping from an individual data stream to a particular drawing coordinate of the image. Another embodiment configures a mapping from an individual data stream to a particular drawing coordinate of the image without user input. In one embodiment, if the data stream is in a state defined as normal (e.g., below a high alarm threshold, or between a high alarm threshold and a low alarm threshold), the corresponding drawing coordinate is set to a base value, and if the data stream is in a state defined as abnormal (e.g., above a high alarm threshold, or outside a range a high alarm threshold and a low alarm threshold), the corresponding drawing coordinate is set to a value different from the base value. In another embodiment, if the data stream is in a state defined as normal, the corresponding drawing coordinate is set to a base value, and if the data stream is in a state defined as abnormal, the corresponding drawing coordinate is set to a value that differs from the base value according to how far the data stream is from the normal state. In other embodiments, a data stream in a state defined as abnormal is mapped to a region of drawing coordinates around the base value, or a region of drawing coordinates around the base value with an area adjusted according to how far the data stream is from the normal state. In other embodiments, if the data stream is in a state defined as abnormal, the corresponding drawing coordinate remains set to the base value but has a color different from the base color or has a color that is adjusted from the base color according to how far the data stream is from the normal state. Other normalizations and mapping schemes from an individual data stream to a particular drawing coordinate of an image are also possible and contemplated within the scope of the illustrative embodiments. An embodiment selects a particular drawing coordinate corresponding to a data stream such that the drawing order of the coordinates corresponds to an identified relationship between component data streams represented by the coordinates.

One embodiment represents sets of two-dimensional coordinates internally as a complex number, in the form a+bi, where a denotes the x coordinate, b denotes the y coordinate, and i denotes the square root of −1. Representing a set of two-dimensional coordinates as one complex number eases mathematical manipulation of two-dimensional coordinates.

During system or application monitoring, an embodiment receives time series data of an application component or system component being monitored. The time series data is data of one or more metrics being monitored for a component. An embodiment uses a configured data normalization and a configured mapping to determine a drawing coordinate corresponding to a current state of each metric being monitored.

An embodiment draws the set of drawing coordinates, using a drawing order corresponding to an identified relationship between components represented by the coordinates. One embodiment uses a drawing speed linking coordinates that corresponds to a currently-measured latency between the components. Another embodiment does not portray latency using drawing speed, instead using a predefined drawing speed. One embodiment includes a user interface capable of providing information regarding a specific drawing coordinate to a user, for example when the user selects a specific drawing coordinate or a region near a specific drawing coordinate. In one embodiment, the information includes data of the metric the drawing coordinate represents. In another embodiment, the information includes data of the metric the drawing coordinate represents as well as a log index to log data containing additional data of the metric.

Another embodiment does not draw the set of drawing coordinates directly, but instead draws an epicycloid based on the set of drawing coordinates. In geometry, an epicycloid is a plane curve produced by tracing the path of a chosen point on the circumference of a circle which rolls without slipping around a fixed circle. The rolling circle is called an epicycle. An embodiment extracts a first set of frequencies from the x coordinate of each set of drawing coordinates, or from the real component of a complex number representation of each set of drawing coordinates. An embodiment extracts a second set of frequencies from the y coordinate of each set of drawing coordinates, or from the imaginary component of a complex number representation of each set of drawing coordinates. An embodiment sorts each set of frequencies into descending order, then draws the image as an epicycloid, using epicycles generated using the two sorted frequency lists, with a drawing speed between coordinates representing a latency of a monitored data flow between application components represented by the coordinates. Each frequency in a frequency list corresponds to a radius of an epicycle. Techniques for extracting a set of frequencies from a two-dimensional coordinate represented as a complex number, such as the discrete Fourier transform, are presently known.

An embodiment periodically repeats the normalization, mapping, and image drawing using a new current state of the data streams. Thus, a human monitor is provided with a unified view of an overall, near real-time state of an application or system, or relationships between components of the application or system, by monitoring an image that changes based on changes to the data being monitored.

The manner of single image based state monitoring described herein is unavailable in the presently available methods in the technological field of endeavor pertaining to system and application execution monitoring. A method of an embodiment described herein, when implemented to execute on a device or data processing system, comprises substantial advancement of the functionality of that device or data processing system in mapping a set of streams of time series data to a corresponding set of drawing coordinates of an image, and drawing the set of drawing coordinates, using a line between a first drawing coordinate and a second drawing coordinate to represent a dependency between a first executing application or system component and a second executing application or system component.

The illustrative embodiments are described with respect to certain types of components, mappings, normalizations, time series data, coordinates, transforms, images, periods, thresholds, rankings, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
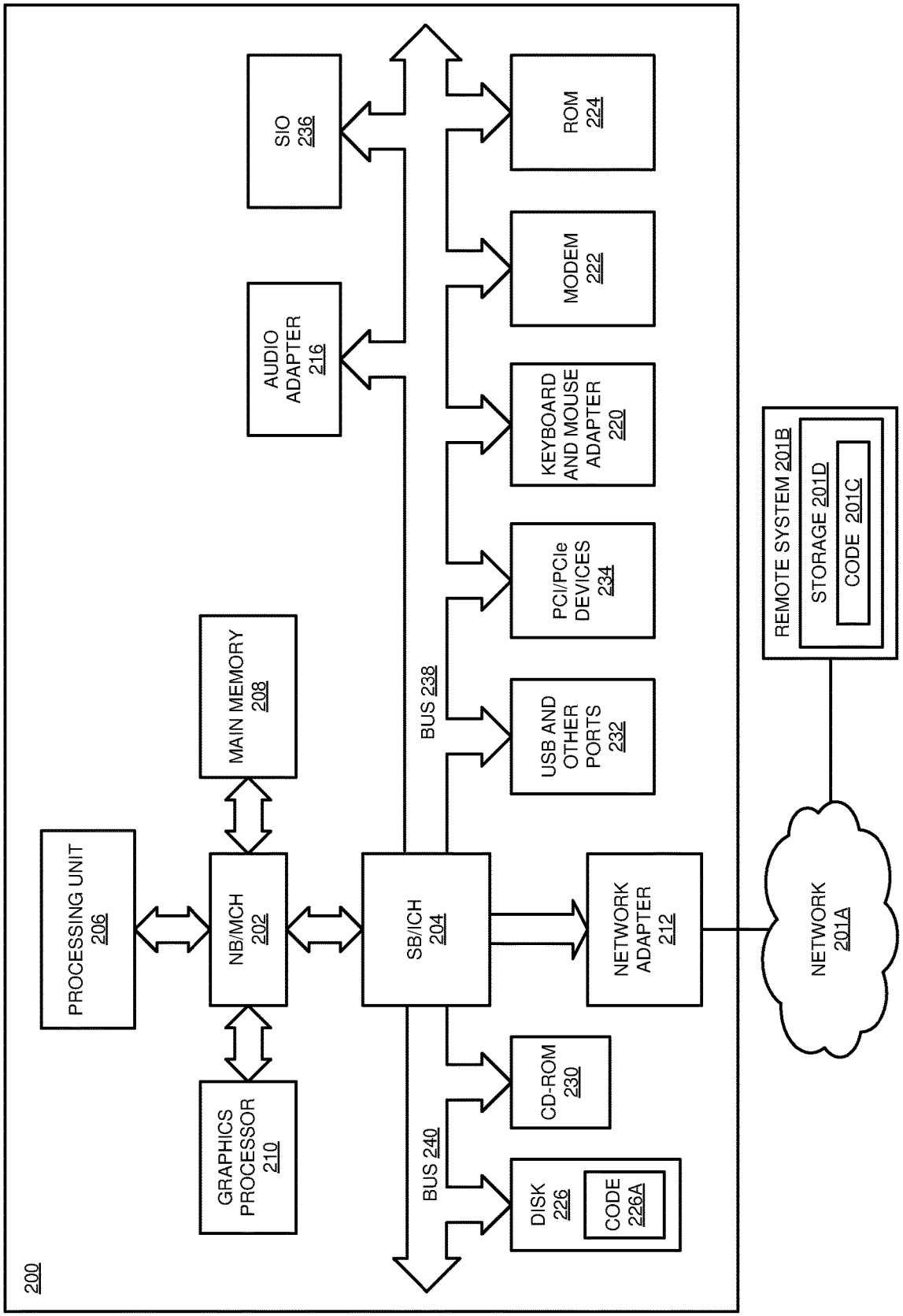
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132. Application 105 receives time series data of a state of an application or system component executing in any of servers 104 and 106, clients 110, 112, and 114, and device 132, or another system.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
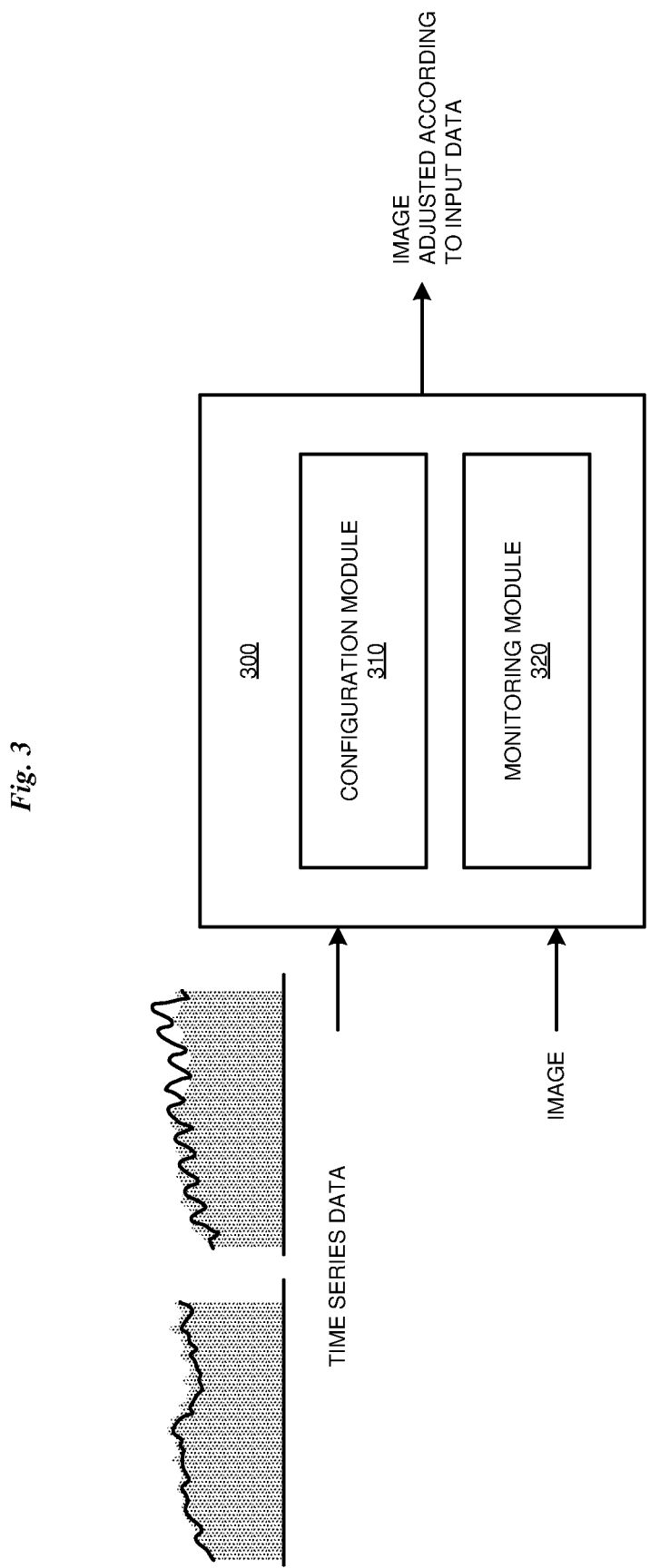
FIG. 3 depicts a block diagram of an example configuration for single image based state monitoring in accordance with an illustrative embodiment.

With reference to FIG. 3, this figure depicts a block diagram of an example configuration for single image based state monitoring in accordance with an illustrative embodiment. Application 300 is an example of application 105 in FIG. 1 and executes in any of servers 104 and 106, clients 110, 112, and 114, and device 132 in FIG. 1.

Configuration module 310 receives a user's selection of an image to be used for state monitoring. Module 310 extracts a set of drawing coordinates from the selected image and arranges the set of drawing coordinates in a drawing order. Module 310 configures a data normalization to be applied to a particular type of metric generating time series data being monitored, and analyzes trace data of an executing application or system being monitored to determine data flow dependencies between application or system components. Module 310 uses a configured data normalization to configure a mapping from an individual data stream to a particular drawing coordinate of the image, and selects a particular drawing coordinate corresponding to a data stream such that the drawing order of the coordinates corresponds to an identified relationship between component data streams represented by the coordinates.

Monitoring module 320 receives time series data of an application component or system component being monitored, and uses a configured data normalization and a configured mapping to determine a drawing coordinate corresponding to a current state of each metric being monitored. Module 320 draws the set of drawing coordinates, using a drawing order corresponding to an identified relationship between components represented by the coordinates. One implementation of module 320 includes a user interface capable of providing information regarding a specific drawing coordinate to a user, for example when the user selects a specific drawing coordinate or a region near a specific drawing coordinate. In one implementation of module 320, the information includes data of the metric the drawing coordinate represents. In another embodiment, the information includes data of the metric the drawing coordinate represents as well as a log index to log data containing additional data of the metric.

Another implementation of module 320 does not draw the set of drawing coordinates directly, but instead draws an epicycloid based on the set of drawing coordinates. Module 320 periodically repeats the normalization, mapping, and image drawing using a new current state of the data streams.

Figure 4:
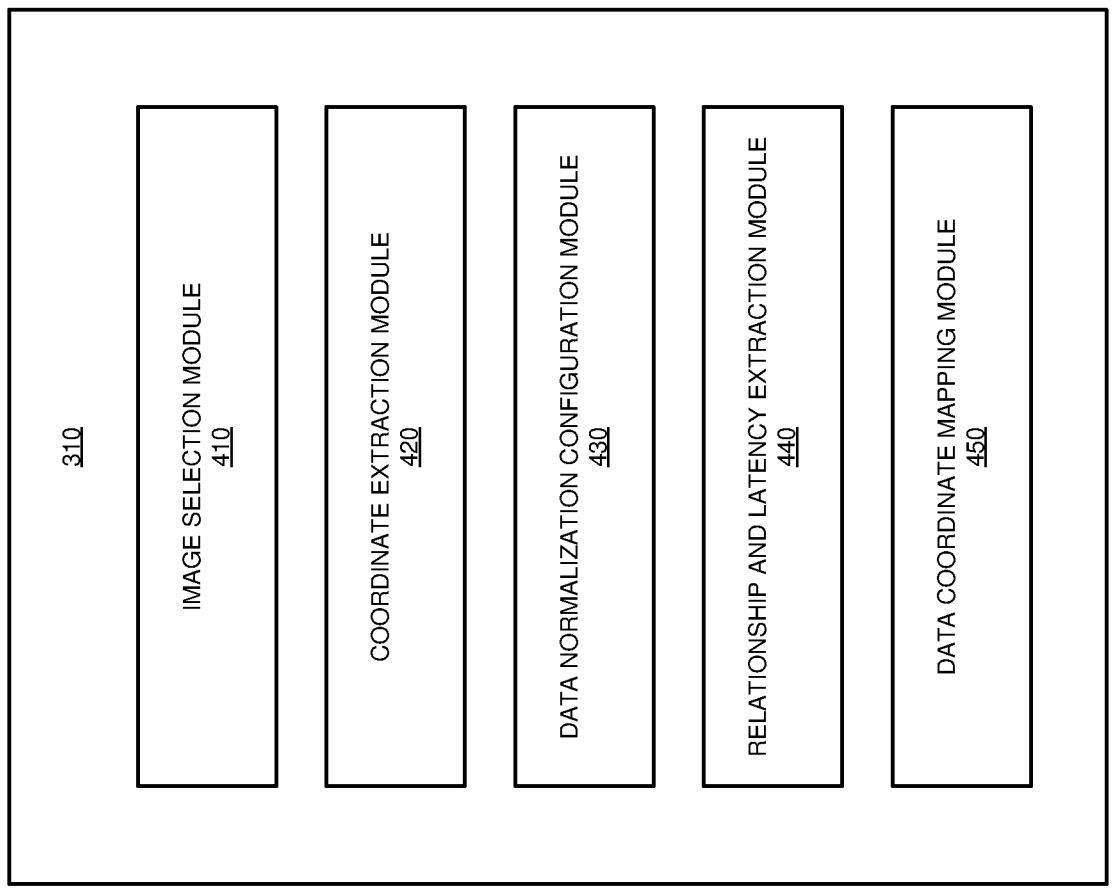
FIG. 4 depicts a block diagram of an example configuration for single image based state monitoring in accordance with an illustrative embodiment.

With reference to FIG. 4, this figure depicts a block diagram of an example configuration for single image based state monitoring in accordance with an illustrative embodiment. In particular, FIG. 4 depicts more detail of module 310 in FIG. 3.

Image selection module 410 receives a user's selection of an image to be used for state monitoring. In one implementation of module 410, a user supplies the image to be used. In another implementation of module 410, a user selects the image from a library of images. Some non-limiting examples of an image to be used for state monitoring are a line drawing and a digital image of a scene.

Coordinate extraction module 420 extracts a set of drawing coordinates from the selected image. For example, if the image is a line drawing in black on a white background, the set of drawing coordinates might include coordinates of all or a subset of the black pixels in the image, but not the white pixels. As another example, if the image portrays an object against a background, the set of drawing coordinates might include coordinates forming a border between a portion of the image portraying the object and a second portion of the image portraying the background. Module 420 arranges the set of drawing coordinates in a drawing order. One implementation of module 420 uses a presently known traveling salesman technique to find the shortest drawing order including all the drawing coordinates.

Data normalization configuration module 430 configures a data normalization to be applied to a particular type of metric generating time series data being monitored. A configured data normalization also includes one or more thresholds defining a normal operational state of the metric. In one implementation of module 430, a data normalization applied to a counter metric is configured to convert a set of counter values to a rate of increase of the counter over a predefined time period, and determine whether the rate of increase is within a normal operational state defined for that particular counter. In one implementation of module 430, a data normalization applied to a gauge metric is configured to convert a value of the metric to a zero to 100 percent range, and determine whether the current value is within a normal operational state defined for that particular gauge. One implementation of module 430 allows a user to configure a normalization and thresholds applicable to a specific metric.

Relationship and latency extraction module 440 analyzes trace data of an executing application or system being monitored to determine data flow dependencies between application or system components. Module 440 also analyzes trace data, such as time spent in each component, to determine latency between components.

Data coordinate mapping module 450 uses a configured data normalization to configure a mapping from an individual data stream to a particular drawing coordinate of the image. In one implementation of module 450, if the data stream is in a state defined as normal (e.g., below a high alarm threshold, or between a high alarm threshold and a low alarm threshold), the corresponding drawing coordinate is set to a base value, and if the data stream is in a state defined as abnormal (e.g., above a high alarm threshold, or outside a range a high alarm threshold and a low alarm threshold), the corresponding drawing coordinate is set to a value different from the base value. In another implementation of module 450, if the data stream is in a state defined as normal, the corresponding drawing coordinate is set to a base value, and if the data stream is in a state defined as abnormal, the corresponding drawing coordinate is set to a value that differs from the base value according to how far the data stream is from the normal state. In other implementations of module 450, a data stream in a state defined as abnormal is mapped to a region of drawing coordinates around the base value, or a region of drawing coordinates around the base value with an area adjusted according to how far the data stream is from the normal state. In other implementations of module 450, if the data stream is in a state defined as abnormal, the corresponding drawing coordinate remains set to the base value but has a color different from the base color or has a color that is adjusted from the base color according to how far the data stream is from the normal state.

Module 450 selects a particular drawing coordinate corresponding to a data stream such that the drawing order of the coordinates corresponds to an identified relationship between component data streams represented by the coordinates. One implementation of module 450 represents sets of two-dimensional coordinates internally as a complex number, in the form a+bi, where a denotes the x coordinate, b denotes the y coordinate, and i denotes the square root of −1.

Figure 5:
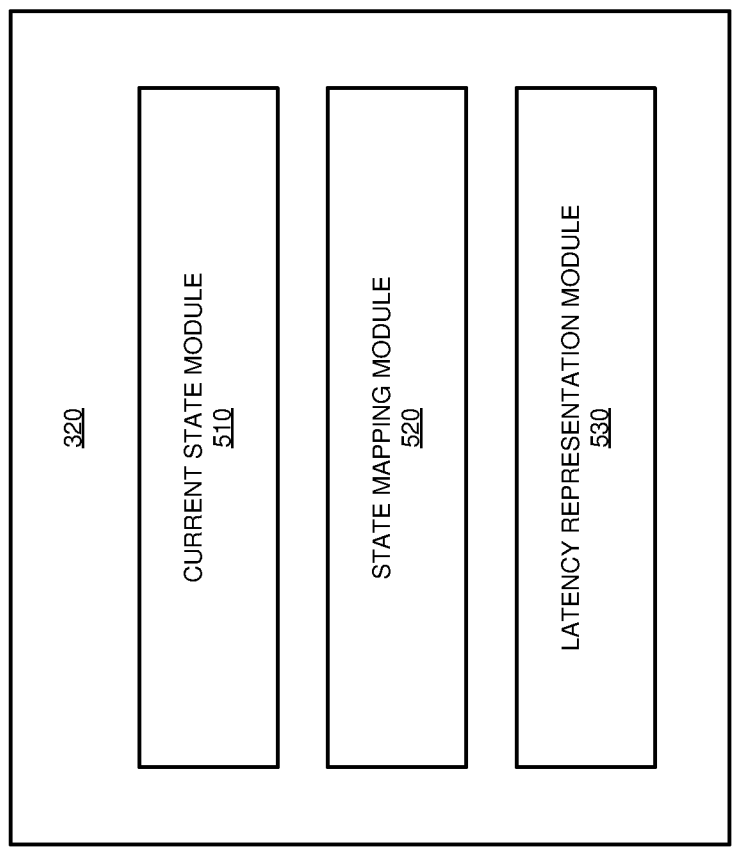
FIG. 5 depicts a block diagram of an example configuration for single image based state monitoring in accordance with an illustrative embodiment.

With reference to FIG. 5, this figure depicts a block diagram of an example configuration for single image based state monitoring in accordance with an illustrative embodiment. In particular, FIG. 5 depicts more detail of module 320 in FIG. 3.

Current state module 510 receives time series data of an application component or system component being monitored. The time series data is data of one or more metrics being monitored for a component. State mapping module 520 uses a configured data normalization and a configured mapping to determine a drawing coordinate corresponding to a current state of each metric being monitored. Latency representation module 530 draws the set of drawing coordinates, using a drawing order corresponding to an identified relationship between components represented by the coordinates. One implementation of module 530 uses a drawing speed linking coordinates that corresponds to a currently-measured latency between the components. Another implementation of module 530 does not portray latency using drawing speed, instead using a predefined drawing speed.

Another implementation of module 520 does not draw the set of drawing coordinates directly, but instead draws an epicycloid based on the set of drawing coordinates. Module 520 extracts a first set of frequencies from the x coordinate of each set of drawing coordinates, or from the real component of a complex number representation of each set of drawing coordinates. Module 520 extracts a second set of frequencies from the y coordinate of each set of drawing coordinates, or from the imaginary component of a complex number representation of each set of drawing coordinates. Module 520 sorts each set of frequencies into descending order, then draws the image as an epicycloid, using epicycles generated using the two sorted frequency lists, with a drawing speed between coordinates representing a latency of a monitored data flow between application components represented by the coordinates. Each frequency in a frequency list corresponds to a radius of an epicycle.

Figure 6:
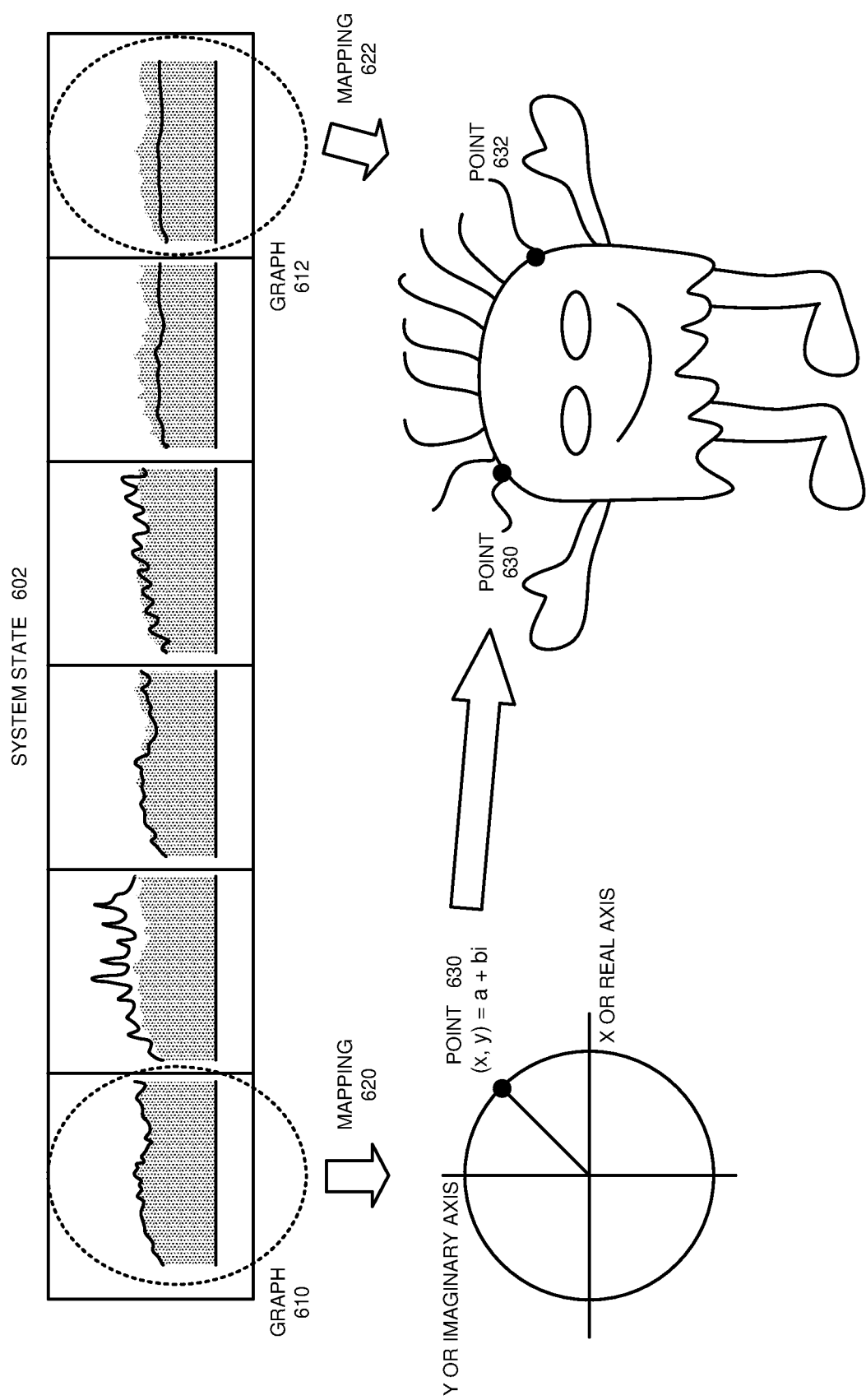
FIG. 6 depicts an example configuration for single image based state monitoring in accordance with an illustrative embodiment.

With reference to FIG. 6, this figure depicts an example configuration for single image based state monitoring in accordance with an illustrative embodiment. The example can be executed using application 300 in FIG. 3.

As depicted, application 300 receives time series data of application components being monitored. The time series data, data of one or more metrics being monitored, is depicted in system state 602. Application 300 uses mapping 620 to determine point 630, a drawing coordinate corresponding to a current state of graph 610. Application 300 also uses mapping 622 to determine point 632, a drawing coordinate corresponding to a current state of graph 612.

Figure 7:
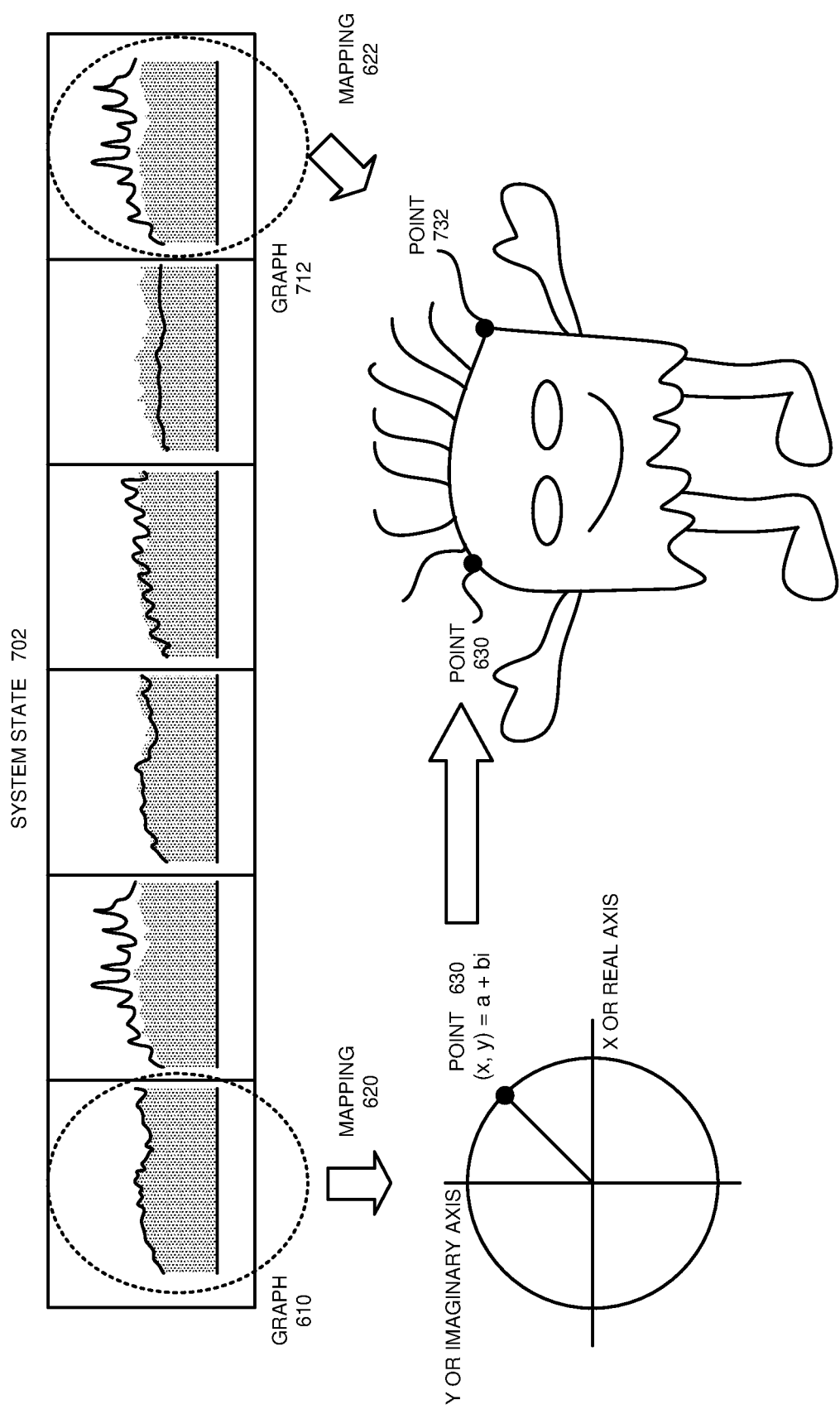
FIG. 7 depicts a continued example configuration for single image based state monitoring in accordance with an illustrative embodiment.

With reference to FIG. 7, this figure depicts a continued example configuration for single image based state monitoring in accordance with an illustrative embodiment. The example can be executed using application 300 in FIG. 3. Graph 610, mappings 620 and 622, and point 630 are the same as graph 610, mappings 620 and 622, and point 630 in FIG. 6.

As depicted, application 300 receives time series data of application components being monitored. The time series data, data of one or more metrics being monitored, is depicted in system state 702. Application 300 uses mapping 620 to determine point 630, a drawing coordinate corresponding to a current state of graph 610. Application 300 also uses mapping 622 to determine point 732, a drawing coordinate corresponding to a current state of graph 712. Note that since graph 712 is different from graph 612 in FIG. 6, point 732 is also different from point 632.

Figure 8:
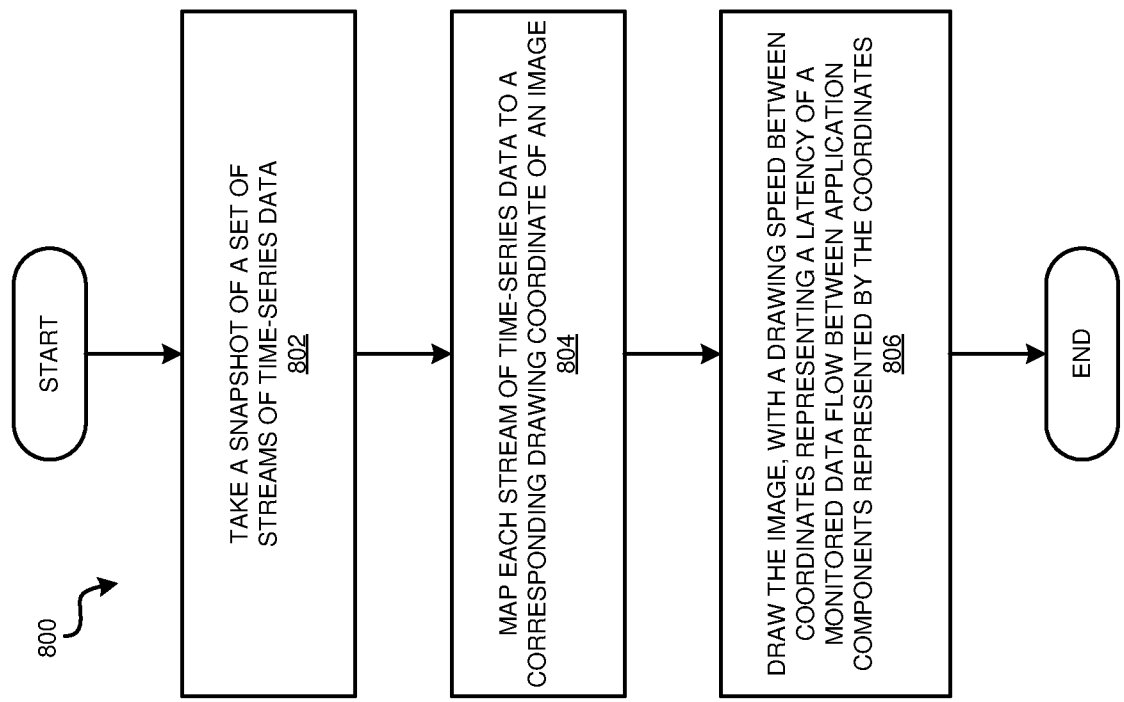
FIG. 8 depicts a flowchart of an example process for single image based state monitoring in accordance with an illustrative embodiment.

With reference to FIG. 8, this figure depicts a flowchart of an example process for single image based state monitoring in accordance with an illustrative embodiment. Process 800 can be implemented in application 300 in FIG. 3.

In block 802, the application takes a snapshot of a set of streams of time-series data. In block 804, the application maps each stream of time-series data to a corresponding drawing coordinate of an image. In block 806, the application draws the image, with a drawing speed between coordinates representing a latency of a monitored data flow between application components represented by the coordinates. Then the application ends.

Figure 9:
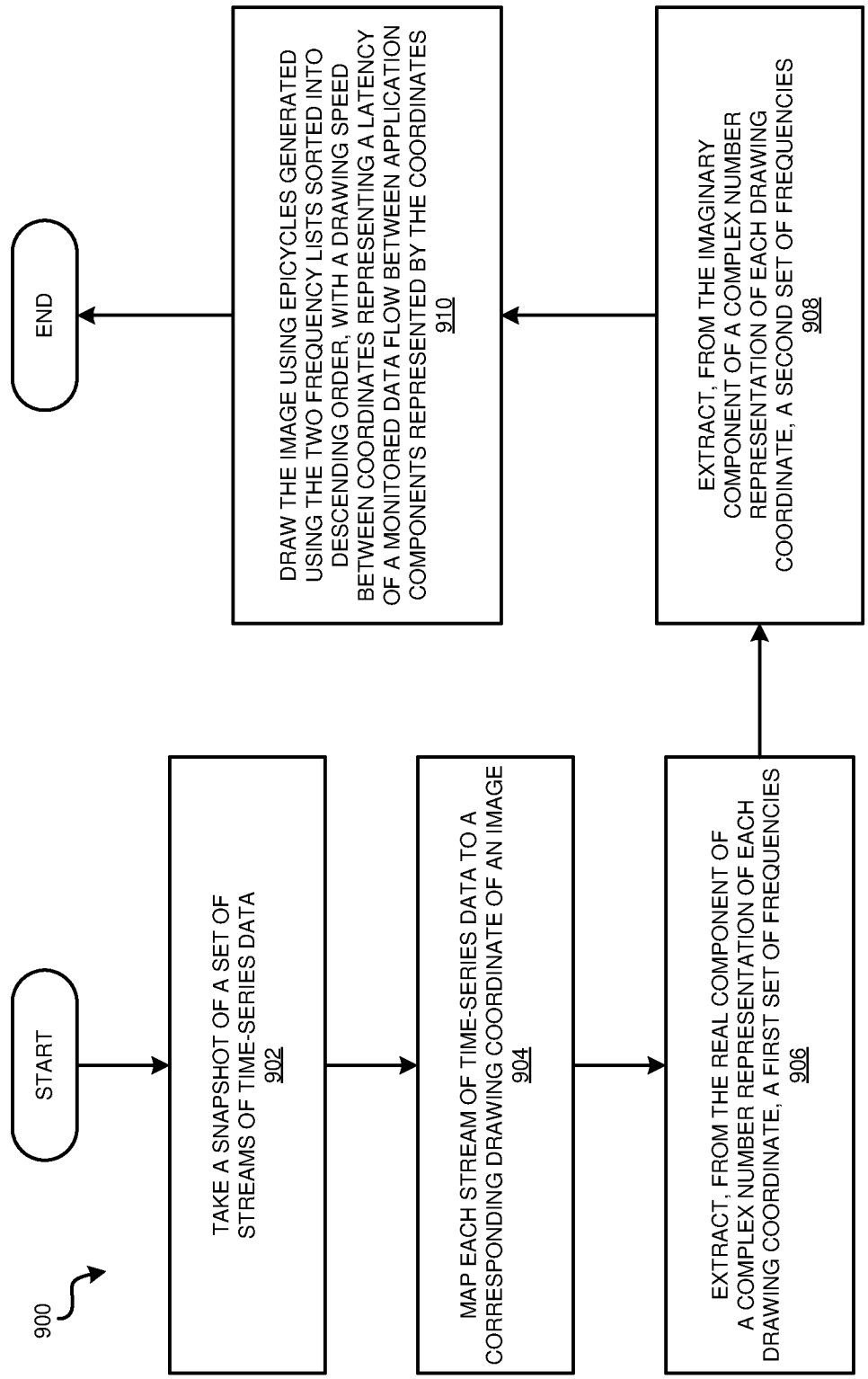
FIG. 9 depicts a flowchart of an example process for single image based state monitoring in accordance with an illustrative embodiment.

With reference to FIG. 9, this figure depicts a flowchart of an example process for single image based state monitoring in accordance with an illustrative embodiment. Process 900 can be implemented in application 300 in FIG. 3.

In block 902, the application takes a snapshot of a set of streams of time-series data. In block 904, the application maps each stream of time-series data to a corresponding drawing coordinate of an image. In block 906, the application extracts, from the real component of a complex number representation of each drawing coordinate, a first set of frequencies. In block 908, the application extracts, from the imaginary component of a complex number representation of each drawing coordinate, a second set of frequencies. In block 910, the application draws the image using epicycles generated using the two frequency lists sorted into descending order, with a drawing speed between coordinates representing a latency of a monitored data flow between application components represented by the coordinates. Then the application ends.

Figure 10:
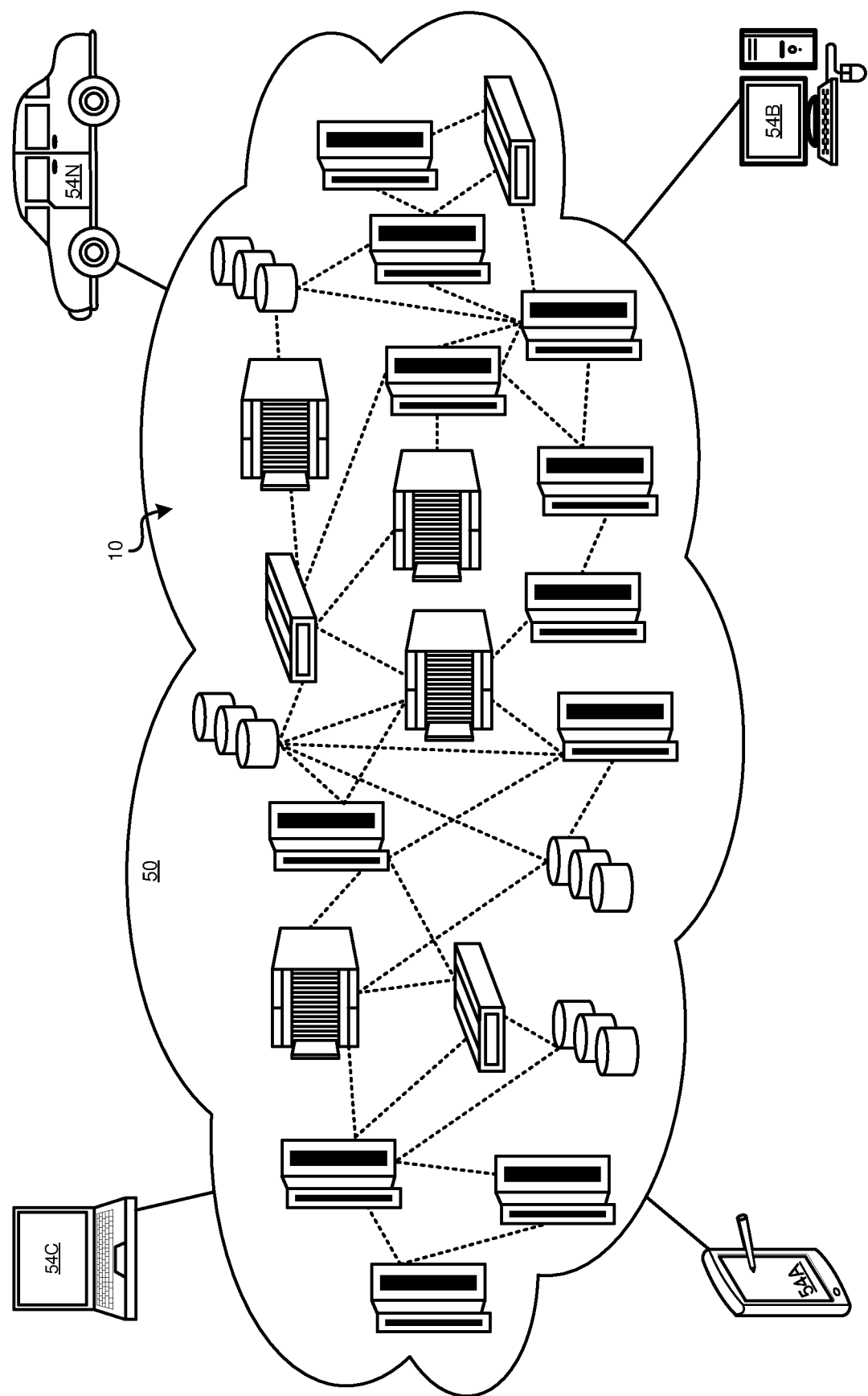
FIG. 10 depicts a cloud computing environment according to an embodiment of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 11:
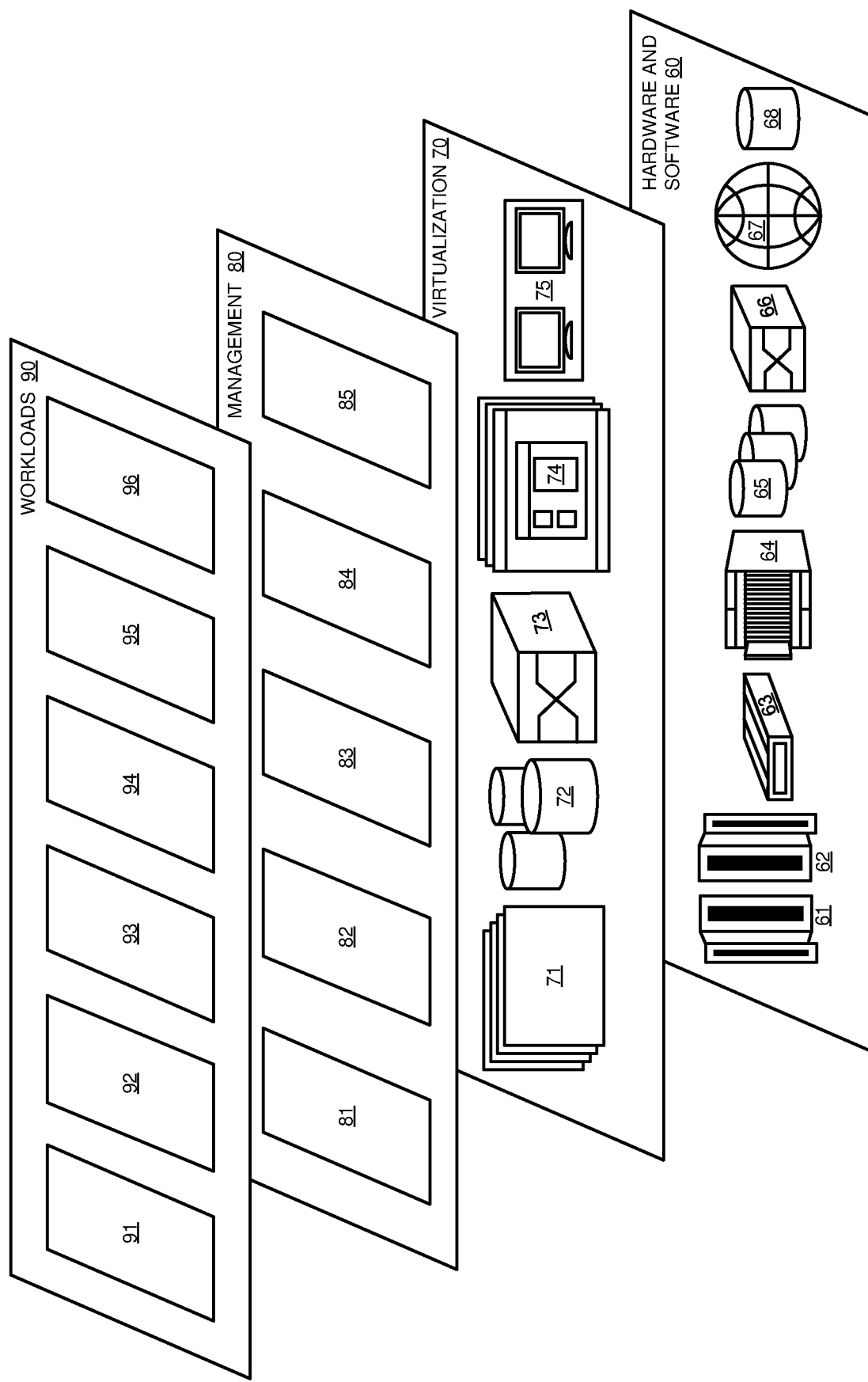
FIG. 11 depicts abstraction model layers according to an embodiment of the present invention.

Referring now to FIG. 11, a set of functional abstraction layers provided by cloud computing environment 50 (FIG. 10) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for single image based state monitoring and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
mapping a set of streams of time series data to a corresponding set of drawing coordinates of an image, wherein a first stream of time series data in the set of streams of time series data comprises data of a first executing application component, wherein a first drawing coordinate in the set of drawing coordinates represents a first state of the first executing application component at a first time; and
drawing the set of drawing coordinates, wherein a line between the first drawing coordinate and a second drawing coordinate represents a dependency between the first executing application component and a second executing application component.

2. The computer-implemented method of claim 1, further comprising:
extracting, from the image, the set of drawing coordinates.

3. The computer-implemented method of claim 1, further comprising:
determining, by analyzing trace data of the first executing application component and the second executing application component, the dependency between the first executing application component and the second executing application component.

4. The computer-implemented method of claim 1, further comprising:
configuring, using a data normalization, a mapping from the first stream of time series data to the first drawing coordinate.

5. The computer-implemented method of claim 4, further comprising:
configuring, according to a data type of the first stream of time series data, the data normalization.

6. The computer-implemented method of claim 1, wherein a drawing speed of the line represents a latency of a monitored data flow between the first executing application component and the second executing application component.

7. The computer-implemented method of claim 1, further comprising:
adjusting, according to a second state of the first executing application component, the first drawing coordinate, the second state determined at a second time, the adjusting resulting in an adjusted first drawing coordinate; and
redrawing, using the adjusted first drawing coordinate instead of the first drawing coordinate, the set of drawing coordinates.

8. A computer program product for single image based state monitoring, the computer program product comprising:
one or more computer readable storage media, and program instructions collectively stored on the one or more computer readable storage media, the stored program instructions comprising:
program instructions to map a set of streams of time series data to a corresponding set of drawing coordinates of an image, wherein a first stream of time series data in the set of streams of time series data comprises data of a first executing application component, wherein a first drawing coordinate in the set of drawing coordinates represents a first state of the first executing application component at a first time; and
program instructions to draw the set of drawing coordinates, wherein a line between the first drawing coordinate and a second drawing coordinate represents a dependency between the first executing application component and a second executing application component.

9. The computer program product of claim 8, the stored program instructions further comprising:
program instructions to extract, from the image, the set of drawing coordinates.

10. The computer program product of claim 8, the stored program instructions further comprising:
program instructions to determine, by analyzing trace data of the first executing application component and the second executing application component, the dependency between the first executing application component and the second executing application component.

11. The computer program product of claim 8, the stored program instructions further comprising:
program instructions to configure, using a data normalization, a mapping from the first stream of time series data to the first drawing coordinate.

12. The computer program product of claim 11, the stored program instructions further comprising:
program instructions to configure, according to a data type of the first stream of time series data, the data normalization.

13. The computer program product of claim 8, wherein a drawing speed of the line represents a latency of a monitored data flow between the first executing application component and the second executing application component.

14. The computer program product of claim 8, the stored program instructions further comprising:
program instructions to adjust, according to a second state of the first executing application component, the first drawing coordinate, the second state determined at a second time, the adjusting resulting in an adjusted first drawing coordinate; and
program instructions to redraw, using the adjusted first drawing coordinate instead of the first drawing coordinate, the set of drawing coordinates.

15. The computer program product of claim 8, wherein the stored program instructions are stored in the at least one of the one or more storage media of a local data processing system, and wherein the stored program instructions are transferred over a network from a remote data processing system.

16. The computer program product of claim 8, wherein the stored program instructions are stored in the at least one of the one or more storage media of a server data processing system, and wherein the stored program instructions are downloaded over a network to a remote data processing system for use in a computer readable storage device associated with the remote data processing system.

17. The computer program product of claim 8, wherein the computer program product is provided as a service in a cloud environment.

18. A computer system comprising one or more processors, one or more computer-readable memories, and one or more computer-readable storage media, and program instructions stored on at least one of the one or more storage media for execution by at least one of the one or more processors via at least one of the one or more memories, the stored program instructions comprising:
- program instructions to map a set of streams of time series data to a corresponding set of drawing coordinates of an image, wherein a first stream of time series data in the set of streams of time series data comprises data of a first executing application component, wherein a first drawing coordinate in the set of drawing coordinates represents a first state of the first executing application component at a first time; and
- program instructions to draw the set of drawing coordinates, wherein a line between the first drawing coordinate and a second drawing coordinate represents a dependency between the first executing application component and a second executing application component.

19. The computer system of claim 18, the stored program instructions further comprising:
- program instructions to extract, from the image, the set of drawing coordinates.

20. The computer system of claim 18, the stored program instructions further comprising:
- program instructions to determine, by analyzing trace data of the first executing application component and the second executing application component, the dependency between the first executing application component and the second executing application component.

* * * * *